(12) United States Patent
Parsio

(10) Patent No.: US 11,660,843 B1
(45) Date of Patent: May 30, 2023

(54) TEARABLE FILM LAMINATE MADE WITH CELLULOSE ACETATE FOR PACKAGING AND CONTAINER PURPOSES

(71) Applicant: Multi-Plastics, Inc., Lewis Center, OH (US)

(72) Inventor: M. David Parsio, Lewis Center, OH (US)

(73) Assignee: Multi-Plastics, Inc., Lewis Center, OH (US)

( * ) Notice: Subject to any disclaimer, the term of this patent is extended or adjusted under 35 U.S.C. 154(b) by 0 days.

(21) Appl. No.: 18/085,035

(22) Filed: Dec. 20, 2022

(51) Int. Cl.
| | | |
|---|---|---|
| *B32B 23/08* | (2006.01) | |
| *B32B 23/20* | (2006.01) | |
| *B32B 27/32* | (2006.01) | |
| *B65D 75/26* | (2006.01) | |
| *B32B 7/12* | (2006.01) | |

(52) U.S. Cl.
CPC ............ *B32B 23/08* (2013.01); *B32B 7/12* (2013.01); *B32B 23/20* (2013.01); *B32B 27/32* (2013.01); *B65D 75/26* (2013.01); *B32B 2307/582* (2013.01); *B32B 2439/46* (2013.01); *B32B 2553/00* (2013.01)

(58) Field of Classification Search
CPC ........... B32B 23/08; B32B 7/12; B32B 23/20; B32B 27/32; B32B 2307/582; B32B 2439/46; B32B 2553/00; B65D 75/26
See application file for complete search history.

(56) References Cited

U.S. PATENT DOCUMENTS

| | | | |
|---|---|---|---|
| 4,190,477 | A | 2/1980 | Ossian et al. |
| 4,311,836 | A | 1/1982 | Schickfluss |
| 4,360,550 | A | 11/1982 | Asakura et al. |
| 4,424,256 | A | 1/1984 | Christensen et al. |
| 4,578,469 | A | 3/1986 | Deger et al. |
| 4,889,923 | A | 12/1989 | Mischke et al. |
| 5,419,955 | A | 5/1995 | Ehrhardt et al. |
| 5,630,308 | A | 5/1997 | Guckenberger |
| 5,648,529 | A | 7/1997 | Jones et al. |
| 5,685,832 | A | 11/1997 | Chen et al. |
| 8,920,520 | B2 | 12/2014 | Garrett et al. |
| 9,023,757 | B2 | 5/2015 | Combs et al. |
| 9,139,660 | B2 | 9/2015 | Combs et al. |
| 10,000,042 | B2 | 6/2018 | Parsio |
| 10,513,592 | B2 | 12/2019 | Parker et al. |
| 10,717,254 | B2 | 7/2020 | Parsio |
| 2021/0107263 | A1* | 4/2021 | Bartolucci .............. B32B 27/36 |

* cited by examiner

*Primary Examiner* — James C Yager
(74) *Attorney, Agent, or Firm* — Jason H. Foster; Kremblas & Foster

(57) ABSTRACT

A polymeric laminate film structure having a cellulose acetate film, and optionally blended with foil and a sealant layer.

12 Claims, 4 Drawing Sheets

TEARABLE FILM LAMINATE MADE WITH CELLULOSE ACETATE FOR PACKAGING AND CONTAINER PURPOSES

BACKGROUND OF THE INVENTION

Films or sheets of polymeric barrier materials are formed into a finished package or "film package" such as a pouch. This can be performed by various techniques, for instance, by forming heat or adhesive seals about the periphery of the shape to be formed into a pouch. For example, if a square pouch is desired, a rectangular film twice the desired length of the pouch is folded. The two parallel sides of the periphery perpendicular to the fold are heat or adhesive sealed. Alternatively, the two parallel sides and the fold are heat or adhesive sealed. In both examples, the food or other material to be packaged is inserted therein, and then the remaining open side of the periphery is heat or adhesive sealed.

Another method for making a pouch is by sealing two similarly-sized rectangular films, which are positioned face-to-face, on three sides. The formed open pouch may be filled with food or other material, and then sealed on the fourth side. For background on pouches or bags and their production, reference is made to U.S. Pat. Nos. 4,190,477, 4,311,742, 4,360,550, 4,424,256, 4,557,377, and 5,630,308, each of which is incorporated herein by reference.

A "stick pack" is a finished packaged that is formed by a single film extending through a forming tube. The film moves longitudinally for a brief period and then stops for a brief period, and steps are carried out by the machine during movement and while stopped. As the film crests a shoulder or collar on the forming tube, it is folded around the tube with the two lateral edges of the film overlapping each other. These overlapping edges are sealed, such as by heat or adhesive. The seal can either be a "lap seal," in which the lateral edges overlap with the outer surface of one edge facing the inner surface of the other edge, or a "fin seal" in which the lateral edges form a longitudinal "fin" on the side of the finished stick pack with the inner surfaces of both edges in contact. A sealer bar makes contact with the vertical overlap on the film to continuously make the vertical seal. Each time the film stops moving, a horizontal sealing jaw comes together to make the top seal of the lower stick pack and the bottom seal of the upper stick pack. While the sealing jaw is closed, the product that is being packaged is injected through the forming tubes into the empty, upper pack. After the product has been released into a stick pack, a knife blade moves forward and cuts the film where it is sealed, and the horizontal seal may be "notched" just under the horizontal seal jaw to make tearing open the pack easier.

The problem encountered by the end user of the food or other material within the pouch or other container is how to open the container. Such pouches are usually formed from tough or strong polymeric barrier materials so the pouches do not open easily. One method for opening such pouches is to manually tear at the pouch, which commonly results in its contents spilling when the package suddenly tears while a large tearing force is being applied. Another method is simply cutting open the pouch with a scissors, knife or other sharp object.

In general, it is desirable for consumers to be able to neatly open a pouch without the need to use a cutting instrument. Furthermore, the problem of how to open a pouch is really two-fold. The first problem is how to initiate the opening. The second problem is providing control of the opening across the entire pouch in the location desired. For example, even if an initial tear is easy to form, it would not be acceptable for the tear to extend through the entire length of the pouch where the user is holding it.

Multiple solutions have been proposed in the art and are summarized in U.S. Pat. No. 5,630,308, cited above. U.S. Pat. No. 5,630,308 solves this problem by laser scoring a polymeric laminate structure so as to enable the pouch to be easily opened along one of the laser-created score lines. Of course, laser scoring adds another step to the manufacturing process, thus increasing cost of the ultimate pouch. Other patents of interest are U.S. Pat. Nos. 10,000,042 and 10,717,254, both of which use a crystal polystyrene homopolymer in a laminate film. This film is excellent, but many producers wish to have a more environmentally-friendly alternative.

One conventional laminate film includes cellophane. Because cellophane is highly permeable to water vapor and oxygen, a barrier coating is formed using saran, or polyvinylidene chloride (PVDC). However, saran can release dioxin. In practice, the cellophane film is only made in certain gauges and only in certain widths. This results in waste because the cellophane product is difficult to recycle.

SUMMARY OF THE INVENTION

The present disclosure proposes to create films with inherent tearability to enable easy hand tearing of the laminate structure, while reducing costs by not adding extra steps to the manufacturing process. The need for expensive lasers is also eliminated. Furthermore, the final product is compostable by consumers after use, thereby providing a solution to many such structures that end up not being disposed of properly.

The current disclosure relates to a polymeric film laminate structure having an outer film comprised of cellulose acetate. Cellulose acetate refers to any acetate ester of cellulose, usually cellulose diacetate. The thickness of the film laminate may be from about 14 microns to about 3 mils, and any thickness in between. In one embodiment, the film laminate is between about 66 microns and 71 microns. The film laminate structure may be formed using various methods by laminating to the cellulose acetate film various other films, some of which are polymer. Some of the films laminated to the cellulose acetate film may be formed from a liquid.

Disclosed herein is a polymeric laminate structure suitable for making containers such as sachets. The polymeric laminate structure comprises an outer cellulose acetate layer laminated to at least two additional polymeric layers. The outer cellulose acetate layer results in tear properties that propagate more readily in a first direction than in other directions. In some embodiments, the outer cellulose acetate layer is blended uniformly with between 0.25 and 20 weight percent of one or more of polypropylene, high-density polyethylene, ethylene vinyl acetate copolymer, or polyethylene. In some embodiments, the polymeric laminate structure comprises from outer layer to inner layer, a first layer comprising cellulose acetate, a second layer comprising an acid copolymer, a third layer comprising foil, and a fourth layer comprising high density polyethylene. In some embodiments the polymeric laminate structure comprises, from outer layer to inner layer, a first layer comprising cellulose acetate, a second layer comprising polyethylene, a third layer comprising high density polyethylene, and a fourth layer comprising linear low density polyethylene. In some embodiments, the polymeric laminate structure comprises, from outer layer to inner layer, a first layer comprising cellulose acetate, a second layer comprising polyethylene, a third layer comprising polyester, a fourth layer comprising polyethylene, a fifth layer comprising at least one high density polyethylene, and a sixth layer comprising linear low density polyethylene. In some embodiments, the polymeric laminate structure comprises, from outer layer to inner layer, an outer layer of cellulose acetate, a second layer of low density polyethylene, a third layer of foil, and an inner layer of a sealant. In some embodiments, at least one of the at least two additional polymeric layers is an adhesive.

Disclosed herein is a container, such as a sachet, with at least one film configured to be torn by hand. The film comprises a polymeric laminate structure with an outer cellulose acetate layer laminated to at least two additional polymeric layers. In some embodiments, the outer cellulose acetate layer is blended uniformly with between 0.25 and 20 weight percent of one or more of polypropylene, high-density polyethylene, ethylene vinyl acetate copolymer, or polyethylene. In some embodiments, the polymeric laminate structure comprises, from outer layer to inner layer, a first layer comprising cellulose acetate, a second layer comprising polyethylene, a third layer comprising high density polyethylene, and a fourth layer comprising linear low density polyethylene. In some embodiments, the polymeric laminate structure comprises, from outer layer to inner layer, a first layer comprising cellulose acetate, a second layer comprising polyethylene, a third layer comprising polyester, a fourth layer comprising polyethylene, a fifth layer comprising at least one high density polyethylene, and a sixth layer comprising linear low density polyethylene. In some embodiments, the outer cellulose acetate layer has a higher degree of molecular orientation in a first direction than a transverse, second direction, which results in tear properties that propagate more readily in one of the directions.

Disclosed herein is a container having a housing defining an internal void. The container comprises at least one laminate film forming the housing, the laminate film having an inner surface facing the void and an outer surfacing facing away from the void. The at least one laminate film comprises an outer first layer comprising cellulose acetate that defines the outer surface, a second layer comprising an acid copolymer, a third layer comprising foil, and an inner layer comprising a sealing layer that defines the inner surface. Cellulose acetate requires a moisture barrier because it does not block passage of water vapor. Furthermore, when exposed to heat or moisture, acids in the film base begin to deteriorate, releasing acetic acid. Cellulose acetate is known to be weak, particularly in relation to conventional packaging materials. Thus, cellulose acetate films are known to have disadvantages. Nevertheless, Applicant has noted that, when a film laminate according to the invention is prepared, the tear properties are equal or better than conventional cellophane film in stick packs. As an advantage, the properties of cellulose acetate render it compostable by consumers.

The cost feasibility of making films for containers as described herein is better than in the prior art because there is less waste due to the ability to put cellulose acetate trimmings back into a melt used to form the film. This is because cellulose acetate is re-soluble. Thus, the cellulose acetate film can be made any width and the waste from trimmings to make the final film the desired size can be put back into a cellulose acetate melt. The laminate film of the present invention is therefore more environmentally friendly.

BRIEF DESCRIPTION OF DRAWINGS

For a fuller understanding of the nature and advantages of the present media and process, reference should be had to the following detailed description taken in connection with the accompanying drawings, in which.

DETAILED DESCRIPTION

Figure 1:
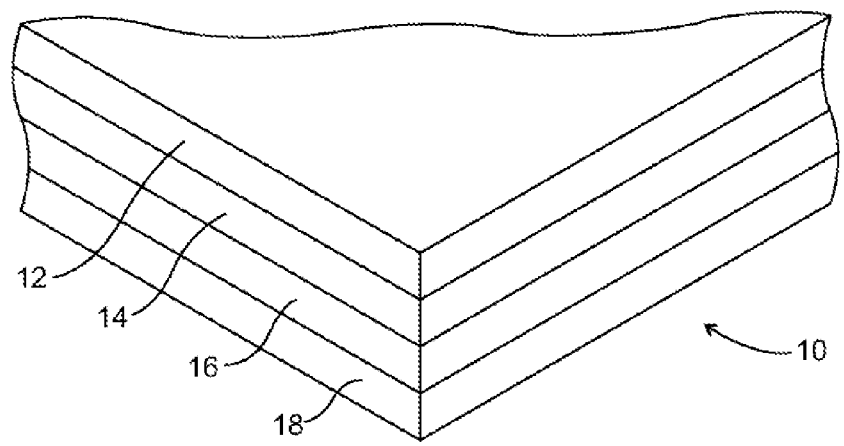
FIG. 1 is a schematic view in perspective illustrating a 4-layer laminate according to the disclosure.

Various embodiments are disclosed herein of films that may be used to form containers for powder, liquid and other substances. Various embodiments are disclosed of containers that are used for containing food, medicines and other materials. The containers described herein may be in various forms, including without limitation, confectionary pouches, stick packs, candy wrappers, and individually sized condiment packs. The containers have in common that in order to open the containers, the films are preferably torn, typically by human hands without using tools. More specifically, the film is torn to form an opening out of which the contents of the container are dispensed. Described below are various films and various methods of making laminate films, the purpose of which is to form containers that can be readily torn using human hands alone to dispense the contents thereof.

A cellulose acetate film sold by Celanese under the trademark CLARIFOIL may be used. A cellulose acetate film may be comprised of cellulose acetate alone and/or blended with inorganic fillers to yield a uniform thin film capable of lamination to other substrates by conventional methods to form the finished film. Specifically, a minimum of 78 wt-percent ("wt" indicating "weight" herein) cellulose acetate blended with a plasticizer and possibly other additives to impart desired characteristics to the film laminate. The additives can be also pre-dispersed uniformly in a wide variety of other compatible polymers including, but not limited to, polypropylene, high-density polyethylene, ethylene vinyl acetate copolymer, or polyethylene as suitable carrier media at ratios between 0.25 and 20 weight percent. The resultant extruded blend will be uniform in nature and yield a thin film possessing high stiffness and also minimum tensile properties required for lamination to other substrates.

The completed film structure can comprise, from outer layer to inner layer, a first layer comprising cellulose acetate and/or cellulose acetate blends, a second layer comprising polyethylene, a third layer comprising high density polyethylene, and a fourth layer comprising linear low density polyethylene. Alternatively, the film structure can comprise, from outer layer to inner layer, a first layer comprising cellulose acetate and/or cellulose acetate blends, a second layer comprising polyethylene (e.g., white polyethylene), a third layer comprising polyester, a fourth layer comprising polyethylene (e.g., white polyethylene and/or a block polymer or copolymer of polyethylene), a fifth layer comprising a co-extrusion which may be a sealant film comprising at least one high density polyethylene (e.g., orange colored high density polyethylene), and a sixth layer comprising linear low density polyethylene (e.g., a clear linear low density polyethylene).

It should be understood that the following abbreviations are used herein:
CA means cellulose acetate,
LDPE means low density polyethylene,
HDPE means high-density polyethylene,
LLDPE means linear low-density polyethylene,
EAA means ethylene acrylic acid,
EMA means ethylene methyl acrylate,
PET means polyethylene terephthalate,
INK means a layer of conventional ink; and
OPP means oriented polypropylene.

The film structures of this invention additionally and/or alternatively can comprise:
(i) CA/INK/LDPE/PET/LDPE/Coextrusion of HDPE, HDPE, LLDPE; or CA/LDPE/PET/LDPE/Coextrusion of HDPE, HDPE, LLDPE;
(ii) CA/Coextrusion of LDPE, EAA/Foil/EMA; or CA/INK/Coextrusion of LDPE, EAA/Foil/Primer/EMA;
(iii) CA INK/Coextrusion of LDPE, LDPE/Coextrusion of HDPE, HDPE, LLDPE;
(iv) CA/INK/LDPE/Coextrusion of HDPE, HDPE, LLDPE; and
(v) CA/HDPE/LLDPE, e.g., by Coextrusion.

Other preferred structures for the present invention include:
(i) CA/INK/LDPE/PET/LDPE/Coextrusion of HDPE, HDPE, LLDPE;
(ii) CA/Coextrusion of LDPE, EAA/Foil/EMA;
(iii) CA/INK/Coextrusion of LDPE, LDPE/Coextrusion of HDPE, HDPE, LLDPE;
(iv) CA/INK/LDPE/Coextrusion of HDPE, HDPE, LLDPE; and
(v) CA/HDPE/LLDPE, e.g., by Coextrusion.

Specific such laminate structures can be illustrated by reference to FIG. 1, which shows a 4-layer laminate. It will be appreciated that the number of layers could be fewer or greater and still be within the precepts of the present disclosure. A laminate structure, 10, is seen to include 4 layers: an outer layer 12, a second layer 14, a third layer 16, and an inner layer 18. In one example of a laminate structure according to the present disclosure, the outer layer 12 is the cellulose acetate layer, the second layer 14 is white/clear LDPE, the third layer 16 is foil (e.g., aluminum), and the inner layer 18 is a sealant layer. It will be appreciated that a wide variety of combinations are available to the industry based on the present disclosure, this combination being by way of example and not by way of limitation.

The cellulose acetate's film tear property is preserved in the lamination process and in combination with a variety of other materials such as foil, polyethylene films and extrudates, adhesives, and seal resins such as SURLYN® brand resin (E. I. Du Pont De Nemours And Company Corporation) and metallocene LLDPE. This "Easy Tear" property is exclusively related to the ease at which the cellulose acetate lamination film will (1) initiate a tear at an edge, and subsequently (2) propagate a tear without any mechanical assistance prior to tear initiation, such as laser scoring.

To form a laminate film according to the invention, one may carry out one of a variety of processes, such as, for example, extrusion coating/lamination using a wet lamination or dry lamination process, co-extrusion or another conventional or a non conventional process. Examples of processes by which the laminate film may be formed are illustrated in FIGS. 2-5, and 7 and are described below with references to these illustrations. Of course, combinations of these processes and/or other processes may be used to form the laminate film, as will be understood by the person of ordinary skill in the technology.

Figure 2:
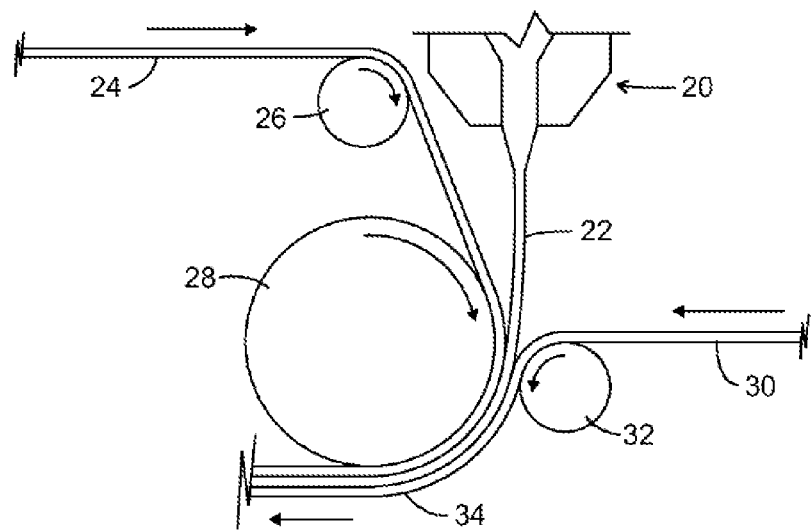
FIG. 2 is a schematic view illustrating a cast/oven tentering film process.

In one example of a process for forming a film laminate according to the invention, FIG. 2 shows a three-ply laminating process in which an extrudate film 22 exits from an extruder 20. A first substrate film 24 is pulled in the direction of the arrow over a first roller assembly 26 and onto a heated roller 28. A second substrate film 30 is pulled over a second roller assembly 32 in the direction of the arrow. A laminate film structure 34 of the present disclosure is formed by combining and bonding the films 22, 24, and 30 as they are pulled over the heated roller assembly 28 where the film 22 bonds the film substrate 24 to the film substrate 30. It will be appreciated that, as an alternative to what is described above, either or both of the films 24 and 30 can be multiple layer laminated film structures for forming a multi-layer film laminate structure. Indeed, any of the films described herein as sources in the lamination process may be multi-layer.

In one contemplated method of making a film laminate, a cellulose acetate (CA) film may be extrusion laminated to another film, for example in a single pass extrusion process or a tandem extrusion process. In one example, a polymer adhesive layer may be applied to the cellulose acetate film, and that adhesive may bond to a foil film. Then a second polymer layer may be adhered to the opposite side of the foil film from the cellulose acetate layer to form a sealant layer for the film laminate.

Alternatively, it is contemplated to apply a polymer layer between a cellulose acetate film and a foil film in a single pass to form a first roll that is taken up in roll form. That roll is then run in a similar process to apply a second layer in another single pass to the foil side of the laminate film. The second layer may be a sealant layer. In still another alternative, it is contemplated to apply the polymer sealant layer to one side of a foil layer in one pass to form a first roll that is taken up in roll form. Then in a second pass an adhesive layer is interposed between the foil film/sealant layer and a cellulose acetate film to construct the completed laminate film.

The above embodiments may be made using the apparatus shown in FIG. 2. For example, the film 22 exiting from the extruder 20 may be an adhesive that adheres to the first substrate film 24 (e.g., cellulose acetate) and to the second substrate film 30 (e.g., foil) that is pulled over the second roller assembly 32. Films 22, 24, and 30 form the laminate structure 34 as they are pulled over the heated roller assembly 28 to form a laminate. Once this combination of films 22, 24 and 30 is formed, it is rolled up and then placed in the location of the film 24 as shown in FIG. 2, and the process described above is carried out again, except that there is no second film layer 30, and the film 22 is a sealant layer.

Figure 3:
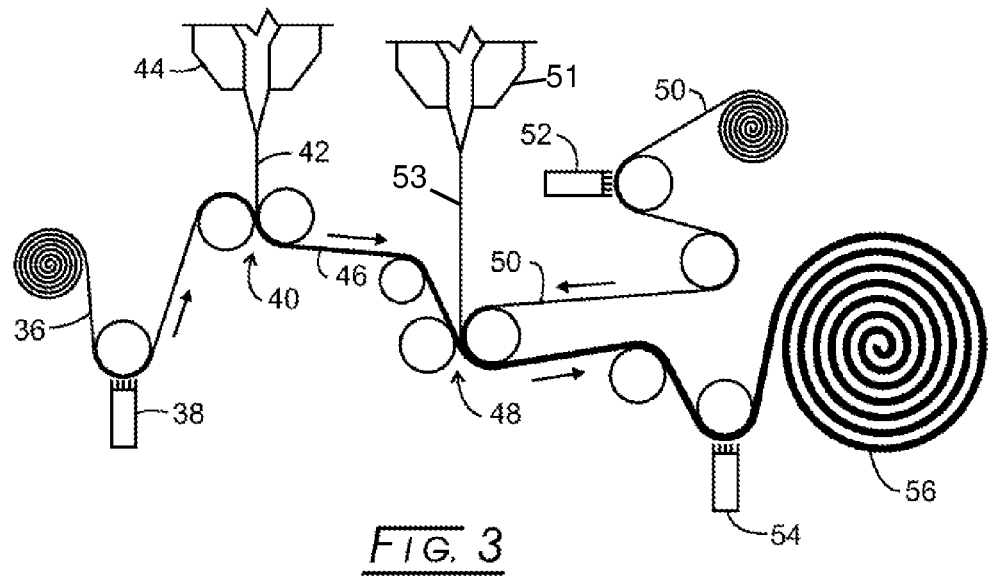
FIG. 3 is a schematic view illustrating a co-extrusion line.

FIG. 3 depicts a co-extrusion process line that uses ozone and surface treatment stations. In particular, a film 36 passes through a first ozone treatment station 38 and over a roller station 40 where an extrudate film 42 exits an extruder 44. The film 46 next passes through a second roller station 48 where it is bonded to a film 50, which has passed through a second surface treatment station 52 by an extrudate film 53 exiting an extruder 51. The combined film from the roller station 48 then passes through a third surface treatment station 54 and is taken up into a roll 56.

Figure 4:
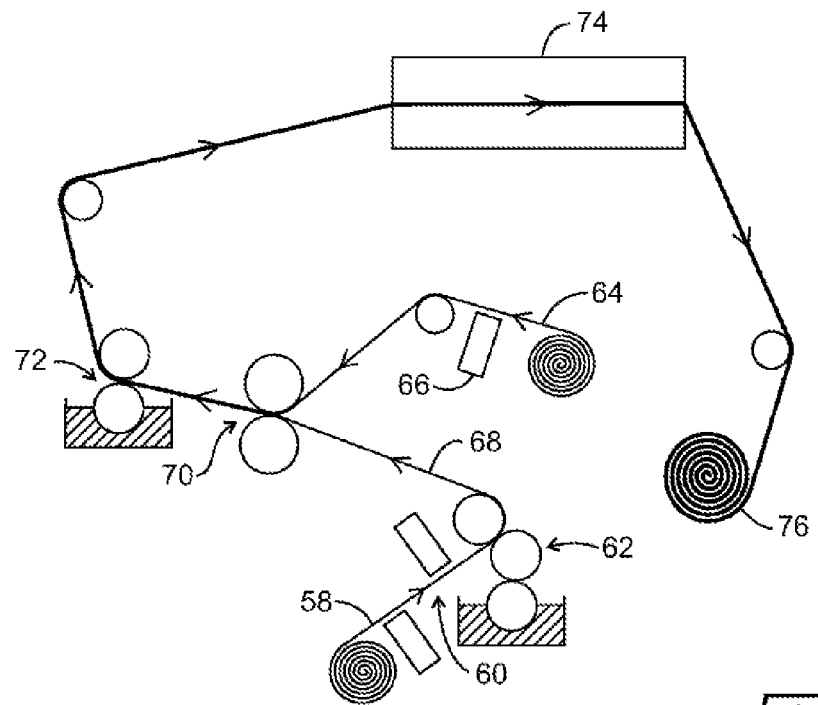
FIG. 4 is a schematic view illustrating a wet lamination process.

FIG. 4 shows a wet lamination process line, in which a first web or film 58 unwinds and passes through a treatment section 60 and has adhesive applied to one side by an adhesive station 62. A second web or film 64 unwinds and passes through a treatment section 66. Treated web 64 and the adhesive-coated web 68, are joined in a nip roller assembly 70 and then through a lacquer application station 72. The joined webs then pass through a drying station 74 and around a rewind station 76.

Figure 5:
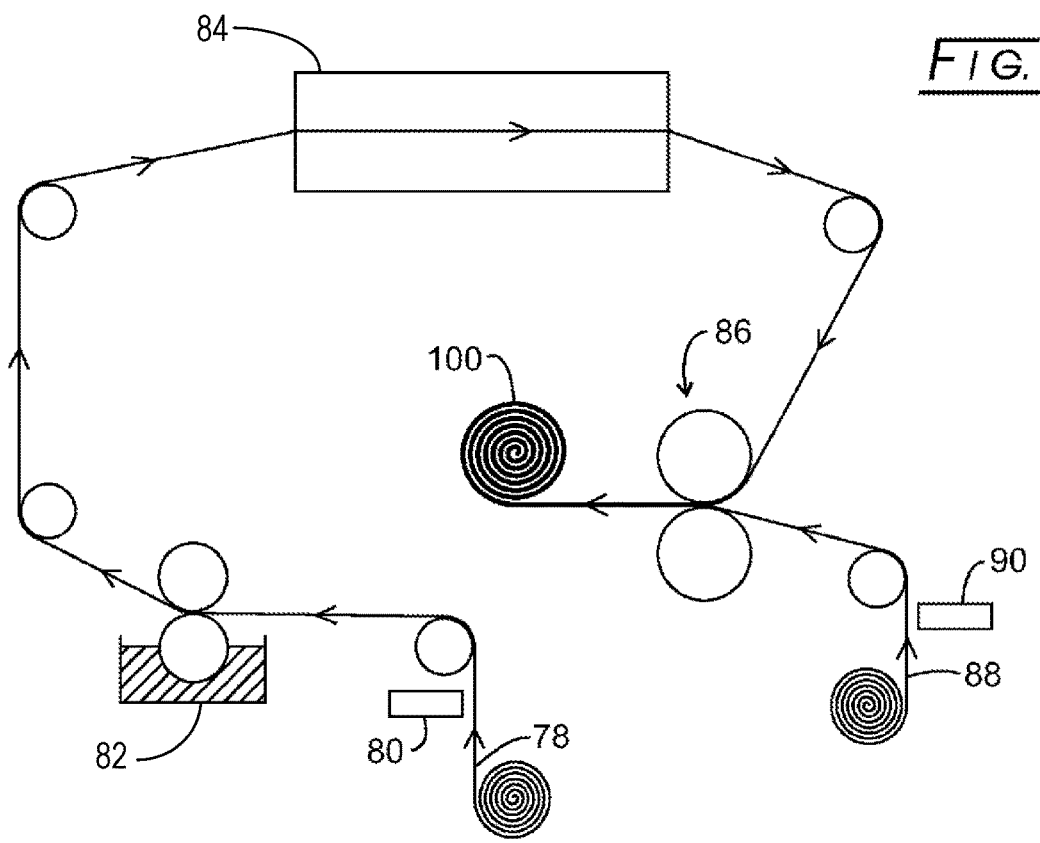
FIG. 5 is a schematic view illustrating a dry lamination process.

FIG. 5 illustrates a dry lamination process line, where a web or film 78 unwinds from a spool and passes through a first treatment station 80 and then through an adhesive station 82 where an adhesive is applied to one of its sides. The adhesive-coated web 78 then may pass through an application roll (e.g., gravure) and then through a drying tunnel 84. The dried web then passes through a nip roller station 86 where it is combined with a second web 88 that itself has passed through a treater 90. A spool assembly 100 then takes up the combined web laminate.

Figure 6:
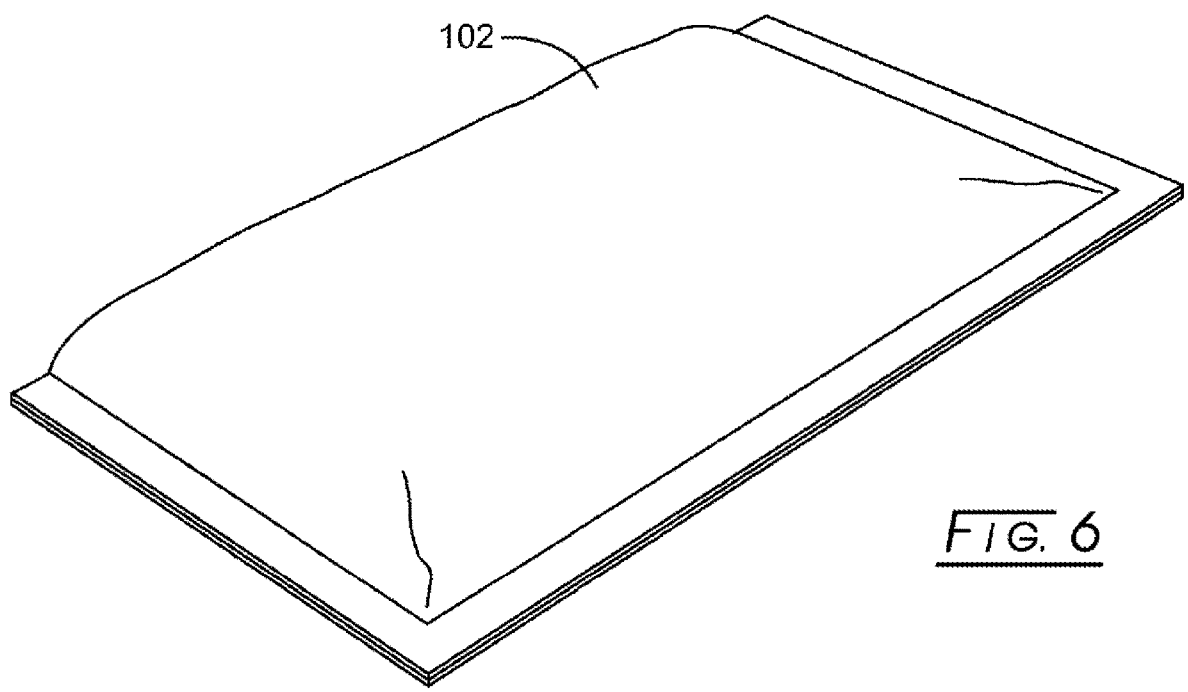
FIG. 6 is schematic view in perspective illustrating a single sachet pouch that can be made using the disclosed cellulose acetate laminate.

A typical sachet 102, for example, is illustrated in FIG. 6. Other sizes and configurations, colors, etc., can be manufactured using the disclosed cellulose acetate laminate in accordance with the precepts set forth herein. Whether a sachet, a pouch or any other structure, the film described herein can be used to construct a container having a housing defining an internal void. The housing in the sachet 102 is defined by the sidewalls that are formed by the film. Thus, any container comprises at least one laminate film forming the housing. The laminate film has an inner surface that faces the void (also facing the contents of the container) and an outer surfacing facing away from the void. The laminate film may comprise an outer first layer made of cellulose acetate that defines the outer surface. The laminate film may also comprise a second layer made of an acid copolymer (e.g., EAA or EMA). The laminate film may also comprise a third layer made of foil and an inner, preferably sealing, layer that defines the inner surface. The inner surface may seat against the contents of the container that are within the void.

Figure 7:
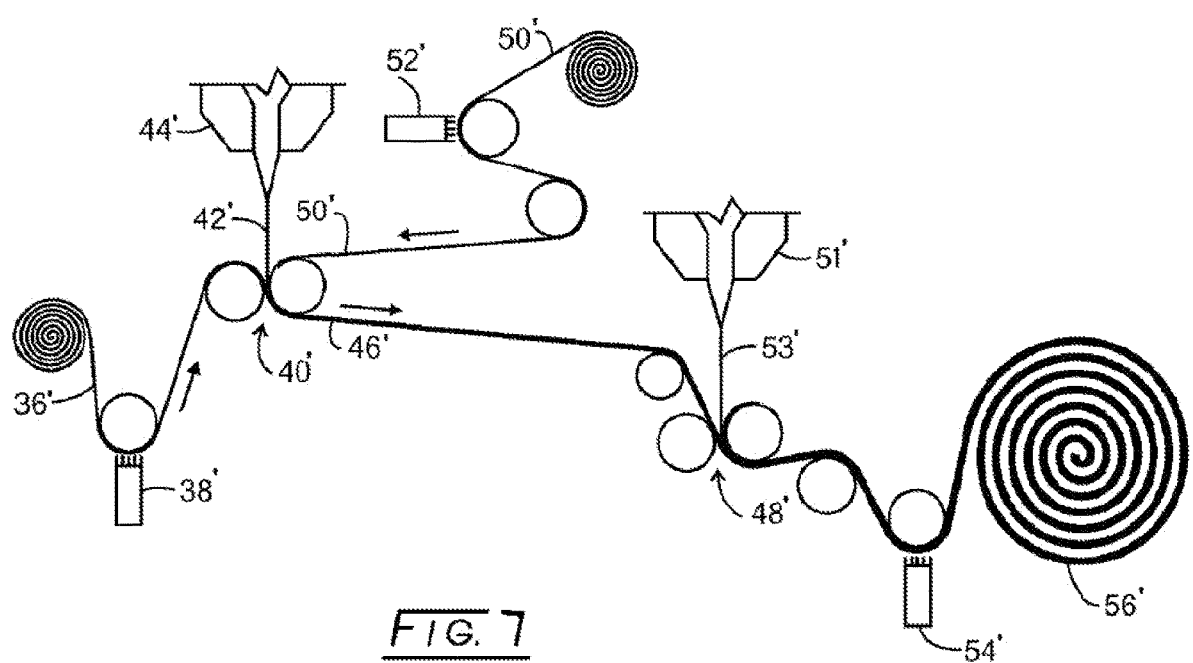
FIG. 7 is a schematic view illustrating an alternative co-extrusion line.

In another example of a process for making the film laminate according to the invention, the film laminate 56' shown in FIG. 7 is formed in a tandem extrusion process where the film laminate 56' is constructed in one pass. An extrudate layer 42' in film form exits an extruder 44', forming a "curtain" of liquid polymer that attaches to a cellulose acetate film 36' and a foil film 50' just before the roller station 40'. One example of cellulose acetate film is manufactured by Celanese, and sold under the trademark CLARIFOIL. Such cellulose acetate film may be suitable for the purposes of the invention. The foil layer 50' extends from a roll and through a treatment 52' to the roller station 40' and seats against the opposite side of the extrudate layer 42' from the cellulose acetate film 36'.

The extrudate layer 42' is melted resin at a temperature around 600 degrees Fahrenheit as it exits the extruder 44'. The extrudate layer 42', the cellulose acetate film 36' and the foil film 50' extend between the pair of rollers (a nip roll and a chill roll) that make up the roller station 40' with the extrudate layer 42' interposed between the cellulose acetate film 36' and the foil film 50'. When the molten extrudate layer 42' contacts the chill roll, or contacts a film that is in contact with the chill roll, the molten material begins to cool and solidify, thereby adhering the films 36' and 50' together.

The resulting film 46', which is the combination of cellulose acetate film 36', cooled extrudate layer 42' and foil film 50', extends downstream to another roller station 48'. Just before entering the roller station 48', an extrudate layer 53' exits the extruder 51' and attaches to the side of the film 46' as another "curtain" of polymer. The extrudate layer 53' is preferably a sealant layer, which is applied to the opposite side of the foil film 50' from the cellulose acetate film 36'.

The pair of rollers that make up the roller station 48' may also include a nip roll and a chill roll. Thus, when the molten extrudate layer 51' contacts the chill roll, or contacts a film that is in contact with the chill roll, the molten material begins to cool and solidify.

The extrudate layer 42' that is interposed between the cellulose acetate film 36' and the foil film 50' may be white in color and may have no significant barrier properties. In one embodiment, the extrudate layer 42' is a coextrusion that includes three different polymer layers: (1) a first polymer layer that has an affinity to bond to the cellulose acetate layer 36', (2) a preferably white layer and (3) a third, tie layer that adheres to the foil film 50'. The first layer may be Ethylene Acrylic Acid Copolymer, abbreviated EAA. The second layer may be polyethylene. The third layer may be EAA. The coextrusion may be any acid copolymer (ACP), such as Ethyl Methylene Acrylic Acid (EMA). Thus, any acid copolymer would work as the coextrusion that forms the layer 42'.

The sealant layer 53', which is suitable for the packaging of powder and liquids in the completed product the final film 56' is used for, can be any coextrusion that is known to work as a sealant layer. One example is a high density polyethylene. Any sealant coextrusions may be used that are understood by a person of skill in the industry as suitable for the purpose of containing the desired material, such as a liquid or a powder, that the completed product, made of the film laminate 56', will contain.

In some embodiments, the cellulose acetate film may have one surface that is very smooth, even glossy, to accept printing. The opposite surface may have a roughened, matt finish. The matt finish surface may be roughened chemically or by using an embossing roll. In some embodiments, the rough side of the cellulose acetate film has a value of roughness within a given range. Such roughness on one side may cause a better interaction between the film and any rollers with which the film comes in contact while the opposing, smooth side remains superior for printing. As an example, the cellulose acetate film 36' in FIG. 7 has a surface contacting the roller at the treatment station 38' that has a matt finish. The surface facing the roller at the roller station 40' is glossy, permitting the extrudate layer 42' to contact the matt surface of the film 36'. The exterior surface of the completed film 56' retains the glossy surface for printing.

While the device has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the US engineering system and all amounts and percentages are by weight, unless otherwise expressly indicated. Also, all citations referred herein are expressly incorporated herein by reference.

The invention claimed is:

1. A polymeric laminate structure suitable for making sachets, the polymeric laminate structure comprising an outer cellulose acetate layer laminated to at least two additional polymeric layers wherein the outer cellulose acetate layer has a higher degree of molecular orientation in a first direction than in a transverse, second direction, which results in tear properties that propagate more readily in one of the directions.

2. The polymeric laminate structure of claim 1, wherein said outer cellulose acetate layer comprises a uniform blend with between 0.25 and 20 weight percent of one or more of polypropylene, high-density polyethylene, ethylene vinyl acetate copolymer, or polyethylene.

3. The polymeric laminate structure of claim 1, wherein from outer layer to inner layer, the polymeric laminate structure comprises: a first layer which is the outer cellulose acetate layer, a second layer comprising polyethylene, a third layer comprising high density polyethylene, and a fourth layer comprising linear low density polyethylene.

4. The polymeric laminate structure of claim 1, wherein from outer layer to inner layer, the polymeric laminate structure comprises: a first layer which is the outer cellulose acetate layer, a second layer comprising polyethylene, a third layer comprising polyester, a fourth layer comprising polyethylene, a fifth layer comprising at least one high density polyethylene, and a sixth layer comprising linear low density polyethylene.

5. The polymeric laminate structure of claim 1, wherein from outer layer to inner layer, the polymeric laminate structure comprises: the outer cellulose acetate layer, a second layer of low density polyethylene, a third layer of foil, and an inner layer of a sealant.

6. The polymeric laminate structure of claim 1, wherein at least one of said at least two additional polymeric layers is an adhesive.

7. The polymeric laminate structure of claim 1, wherein from outer layer to inner layer, the polymeric laminate structure comprises: a first layer which is the outer cellulose acetate layer, a second layer comprising an acid copolymer, a third layer comprising foil, and a fourth layer comprising high density polyethylene.

8. A sachet with at least one film configured to be torn by hand, the film comprising a polymeric laminate structure with an outer cellulose acetate layer laminated to at least two additional polymeric layers wherein the outer cellulose acetate layer has a higher degree of molecular orientation in a first direction than in a transverse, second direction, which results in tear properties that propagate more readily in one of the directions.

9. The sachet of claim 8, wherein said outer cellulose acetate layer comprises a uniform blend with between 0.25 and 20 weight percent of one or more of polypropylene, high-density polyethylene, ethylene vinyl acetate copolymer, or polyethylene.

10. The sachet of claim 8, wherein from outer layer to inner layer, the polymeric laminate structure comprises: a first layer which is the outer cellulose acetate layer, a second layer comprising polyethylene, a third layer comprising high density polyethylene, and a fourth layer comprising linear low density polyethylene.

11. The sachet of claim 8, wherein from outer layer to inner layer, the polymeric laminate structure comprises: a first layer which is the outer cellulose acetate layer, a second layer comprising polyethylene, a third layer comprising polyester, a fourth layer comprising polyethylene, a fifth layer comprising at least one high density polyethylene, and a sixth layer comprising linear low density polyethylene.

12. A container having a housing defining an internal void, the container comprising at least one laminate film forming the housing, the laminate film having an inner surface facing the void and an outer surfacing facing away from the void, wherein the at least one laminate film comprises an outer first layer comprising cellulose acetate that defines the outer surface, a second layer comprising an acid copolymer, a third layer comprising foil, and an inner layer comprising a sealing layer that defines the inner surface wherein the outer first layer comprising cellulose acetate has a higher degree of molecular orientation in a first direction than in a transverse, second direction, which results in tear properties that propagate more readily in one of the directions.

* * * * *